United States Patent [19]
Craig, Jr.

[11] Patent Number: 4,830,829
[45] Date of Patent: May 16, 1989

[54] CONVERSION OF ALUMINUM-MERCURY AMALGAM AND INCIDENTAL MERCURY IN CONTACT WITH ALUMINUM ALLOY SURFACES TO HARMLESS COMPOUNDS

[75] Inventor: Howard L. Craig, Jr., Mullica Hill, N.J.

[73] Assignee: Mobil Oil Corporation, New York, N.Y.

[21] Appl. No.: 93,277

[22] Filed: Sep. 4, 1987

[51] Int. Cl.$^4$ ............................................. C23C 22/00
[52] U.S. Cl. ...................................... 422/7; 148/283; 427/142; 427/255.1; 427/255.2; 427/255.3
[58] Field of Search ..................... 422/7; 148/6.27, 6.3; 427/255.1, 255.2, 255.3, 142; 423/569

[56]     References Cited
         U.S. PATENT DOCUMENTS

| | | | |
|---|---|---|---|
| 2,150,929 | 3/1939 | Kohler et al. | 427/142 |
| 2,636,831 | 10/1949 | Carney | 427/255.3 |
| 4,701,212 | 10/1987 | Yan | 75/26 |
| 4,709,118 | 11/1987 | Yan | 585/820 |
| 4,764,219 | 8/1988 | Yan | 134/2 |

FOREIGN PATENT DOCUMENTS 1452970 10/1976 United Kingdom .

Primary Examiner—Michael S. Marcus
Assistant Examiner—Amalia L. Santiago
Attorney, Agent, or Firm—Alexander J. McKillop; Charles J. Speciale

[57]     ABSTRACT

A method for treating mercury-contaminated aluminum surfaces to render aluminum-mercury amalgam and liquid mercury harmless to aluminum is provided. The method involves converting the mercury to a compound which is inert to aluminum, such as mercuric sulfide, at temperatures below the freezing point of water. This is accomplished by contacting the aluminum surface with a condensable solvent such as carbon disulfide, carbonyl sulfide, or tetrahydrofuran having gaseous hydrogen sulfide dissolved therein, and then dissolving a reactive gas such as sulfur dioxide within the solvent. The reaction of the two dissolved gases within the solvent generates the sulfur which reacts with the mercury to form mercuric sulfide.

23 Claims, No Drawings

CONVERSION OF ALUMINUM-MERCURY AMALGAM AND INCIDENTAL MERCURY IN CONTACT WITH ALUMINUM ALLOY SURFACES TO HARMLESS COMPOUNDS

NATURE OF INVENTION

This invention relates to a method for rendering nonreactive and noncorrosive the mercury and mercury amalgams which accumulate in gas processing equipment. More importantly this invention relates to a method for restoring the ductility of aluminum bodies, particularly aluminum tubing whose metallurgical properties have been damaged by exposure to mercury.

BACKGROUND OF THE INVENTION

The material of choice for heat exchangers in LNG and LPG plants is aluminum. Aluminum is chosen primarily because of its high thermal conductivity, ease of fabrication, reasonable cost and availability. A difficulty arising from the use of aluminum to construct heat exchangers for LNG plants is the fact that all natural gas contains measureable amounts of mercury. Mercury is hazardous to aluminum equipment because the mercury promotes rapid deterioration of the aluminum once the mercury penetrates the coating of aluminum oxide usually present on aluminum surfaces. The aluminum becomes embrittled and is subject to failure when tensile stresses are applied.

Attempts to cope with the problem of mercury contamination in natural gas have been based on either replacing the equipment from time to time, flaring the gas, or diluting it with an inert gas. None of these approaches has been particularly successfully either from a technical or economic view point.

Plants processing gases of relatively high mercury concentration, for instance greater than one part per billion, usually treat incoming feed gas to reduce the mercury concentration to less than 0.1 parts per billion. Nevertheless, over a number of years of operation mercury accumulates on the aluminum surfaces in sufficient quantity to become potentially hazardous and engender failure.

Ordinarily the incoming feed gas is passed through beds of activated charcoal containing elemental sulfur deposited thereon at moderately elevated temperatures. The elevated temperature is required to promote the direct reaction of mercury vapor and sulfur to form mercuric sulfide. As noted previously, however, some mercury escapes from this treatment system and in time permeates throughout the rest of the plant, particularly in areas where the equipment is made from aluminum or aluminum alloys. A method to convert the aluminum-mercury amalgam formed and the accumulated liquid mercury is a highly desirable objective.

Thus, a primary object of this invention is to provide a physical-chemical treatment for aluminum heat exchangers and other aluminum equipment that has become contaminated with mercury. Another object of the invention is to restore the ductility of aluminum components, particularly aluminum tubing that has been exposed to mercury and thereby damaged. Still, another object of this invention is to decontaminate the aluminum surface during the time when the equipment is not in use, that is during the normal derime time for gas liquefaction equipment. Another object is to accomplish this decontamination without diminishing either mechanical properties or heat transfer properties of the equipment.

SUMMARY OF THE INVENTION

Briefly stated this invention comprises a process for treating a mercury contaminated surface or a surface on which mercury amalgam is present. The process comprises the steps of: (1) contacting the surface of the equipment with a solvent which is nonreactive with aluminum and mercury but which will dissolve a sulfur-containing reactive material such as hydrogen sulfide; (2) contacting the liquid coated surface with hydrogen sulfide; and (3) contacting the liquid wet surface with anhydrous ammonia or sulfur dioxide. All the preceding operations are carried out preferably at temperatures below the freezing point of water (0° C.) and above a temperature of −40° C. Alternatively steps (1) and (2) can be combined by bubbling the hydrogen sulfide through the solvent and condensing a gas saturated solvent on the surface of the aluminum surface. Also, if desirable the hydrogen sulfide can be diluted by the inclusion of a non-reactive gas such as nitrogen.

DETAILED DESCRIPTION OF THE INVENTION

As indicated above the equipment contemplated for the treatment described herein includes aluminum heat exchangers in which expansive surfaces are exposed to contact with mercury-contaminated gas. It is recognized that there may be other instances however, when it will be desirable to treat an aluminum surface which has been contaminated with mercury.

The solvent used to contact the aluminum surface can be any solvent which will dissolve hydrogen sulfide. Such solvents include carbon disulfide, carbonyl sulfide, tetrahydrofuran or any liquid which remains liquid at these low temperatures and is a solvent for gases such as hydrogen sulfide, sulfur dioxide and ammonia. The solvent is applied to the surface by either spraying it with solvent or by vaporizing the solvent and allowing it to condense on the chilled surface. The preferred range of temperature for this operation is 0° C. to −40° C. Following the coating of the aluminum surface with the solvent, the hydrogen sulfide is applied to the surface. Sufficient time should be allowed to enable the surface to absorb the hydrogen sulfide, after which time any excess hydrogen sulfide can be removed by purging with a gas such as nitrogen, over the surface. As indicated previously the application of solvent and introduction of hydrogen sulfide gas can be combined in a single step wherein the solvent is vaporized by spraying with the hydrogen sulfide and flowing the mixture over the mercury contaminated surface. The hydrogen sulfide can be diluted with a carrier gas such as nitrogen.

Following this operation anhydrous ammonia or sulfur dioxide gas is then flowed over the surface and allowed to contact and react with the solvent and hydrogen sulfide present therein. The result of this combination of reactants is that the mercury present in droplet form, as well as the mercury amalgam, is coated on the exterior with a mercury oxide or a mercuric sulfide coating. Following this operation, the system can be again purged of ammonia or sulfur dioxide gas and is then returned to service or is further subjected to deriming procedures as may be appropriate.

EXAMPLES

Example 1

To demonstrate the effectiveness of this invention the exterior surfaces of five (5) aluminum tubes were first exposed to or contacted with mercury vapor providing an opportunity for the mercury to form an amalgam on the aluminum surface and to otherwise contaminate it. Four of the tubes were then further treated by condensing vaporized carbon disulfide on to the tubes. Three (3) of the tubes with the carbon disulfide wet surface were exposed to an atmosphere of hydrogen sulfide for a period of 60 minutes. No visible reaction occurred during this period. The three tubes were then contacted briefly with nitrogen to purge any hydrogen sulfide gas present and were then contacted with ammonia. Immediately a yellow compound, ammonium sulfide, formed on the surface of the tubes and subsequently, a black material formed on the mercury surfaces present. The tubes were then allowed to warm from the temperature of $-4°$ F. to room temperature and were tested in an ATS machine. The ATS machine determines tensile strength, and the number for reduction in area provided in the following table is one of several mechanical properties that demonstrates embrittlement or the lack of embrittlement. A higher number (over 36) indicates less embrittlement and restoration of lost ductility. Results of these test runs are shown in the following Table.

TABLE 1

| Run No. | Treatment | Reduction in Area |
|---|---|---|
| 130T | (Control) No induced mercury contamination | 41.8% |
| 131T | (Control) No induced mercury contamination | 41.9% |
| 151T | Liquid mercury in crevice | 24.4% |
| 153T | Liquid mercury. in crevice; $H_2S$ in $CS_2$ followed by $NH_3$ | 38.8% |
| 154T | Liquid mercury in crevice; $H_2S$ in $CS_2$ followed by $NH_3$ | 43.0% |

Example 2

A similar test was made in which sulfur dioxide was used in place of the ammonia in the previous example. Sulfur dioxide is preferred over ammonia. The test procedure was the same as that in the previous example except that after the solvent-contacted surface had been saturated with hydrogen sulfide, the hydrogen sulfide was vented and the carbon disulfide-hydrogen sulfide wet surface was contacted with sulfur dioxide. The $SO_2$ reacts with the hydrogen sulfide. After sufficient contact time with the sulfur dioxide, the tubes were again vented of sulfur dioxide and tested for tensile strength. Results listed in the following Table 2, show that this treatment also resulted in restoration of ductility. The reaction between hydrogen sulfide and sulfur dioxide is surprising, since it has been formerly thought the two would react only at elevated temperatures and in the presence of a catalyst. The stoichiometry of the reaction is believed to be $2H_2S(CS_2)+SO_2(\rightarrow 3S+2-H_2O$.

TABLE 2

| Run No. | Treatment | Reduction in Area | | Results |
|---|---|---|---|---|
|  | None (control) | 41.3% | (3)* | Ductile |
| V44 | Liquid mercury, vapor deposited | 34.4 | (8) | Embrittled |
| V45 | $H_2S$ through $CS_2$ plus $SO_2$ for 15 minutes at $-53°$ C. | 41.6 | (5) | Ductility restored |
| V48 | $H_2S$ through $CS_2$ plus $SO_2$ for 118 minutes at $-25°$ C. | 39.1 | (4) | Ductility restored |
| V48A | Same as V48, except only for 56 minutes | 35.1 | (4) | Embrittled |

EXAMPLE 3

A third series of tests similar to those described previously were performed under the conditions outlined in Table 3. These tests were made to help in determining the optimum conditions for carrying out the process of this invention.

TABLE 3

| Run Number | V45 | V53 | V52 | V54 | V56 | V49 | V55 | V50 | V57 |
|---|---|---|---|---|---|---|---|---|---|
| Temp. °C. of Al tubing during treatment | −55 | −35 | −35 | −55 | −35 | −55 | −55 | −35 | −62 |
| Temp. °C. of $CS_2$ source during treatment | −15 | −5 | −15 | −5 | −15 | −5 | −15 | −5 | −13.5 |
| Gas bubbled through $CS_2$ | $H_2S$ | $H_2S$ | $SO_2$ | $SO_2$ | $H_2S$ | $H_2S$ | $SO_2$ | $SO_2$ | $H_2S$ |
| Molar ratio of $H_2S$ to $SO_2$ flowed through system | 1:1 | 1:1 | 1:1 | 1:1 | 4:1 | 4:1 | 4:1 | 4:1 | 3.8:1 |
| Rate, Ft$^3$/hr of $N_2$ carrier through system | 0.1 | 0.9 | 0.9 | 0.1 | 0.1 | 0.9 | 0.9 | 0.1 | 0.1 |
| Time, minutes allowed for ($H_2S$, $SO_2$, $CS_2$) to flow through system | 15 | 105 | 15 | 105 | 105 | 15 | 105 | 15 | 37.5 |
| Drying time before tensile testing, hours | 8 | 8 | 40 | 40 | 40 | 40 | 8 | 8 | 4.8 |
| Reduction in cross section at tensile failure, percent | 41.64 | 24.98 | 21.02 | 33.14 | 38.70 | 30.46 | 29.58 | 36.96 | 40.3 |

The test designated V-45 shows what is deemed to be an example of the optimum conditions. In Runs V-53, -52, -49, and -55 the rate of carrier gas injection was too great so that the $H_2S$ and $SO_2$ did not have time to react. Also in V-52, and -55 the temperature of the $CS_2$ source through which the $SO_2$ was bubbled was less than the liquefaction temperature of $SO_2$ ($-10°$ C.) so that much of it remained liquid and did not react. V-57 represents the optimum conditions for performing the test.

EXAMPLE 4

This example illustrates the use of tetrahydrofuran (butylene oxide) as a solvent for $H_2S$ and $SO_2$. A test (V59) was conducted under conditions the same as those of test V57, Table 3 using tetrahydrofuran as the solvent. However, the temperature of the tetrahydrofuran was increased to 4° C., to raise its vapor pressure to a value equivalent to that of the carbon disulfide in use in run number V-57. Five specimens were tested and showed an average of 40.0 percent reduction in cross section when tested for tensile strength. This value demonstrates a remarkable restoration of tensile strength.

I claim:

1. A method for treating a mercury-contaminated aluminum surface, comprising:
    (a) providing a liquid solvent which is substantially nonreactive with aluminum or mercury but capable of dissolving a sulfur-bearing component;
    (b) contacting said mercury-contaminated aluminum surface with said liquid solvent;
    (c) dissolving a sulfur-bearing component into said liquid solvent;
    (d) dissolving a gas reactive with said sulfur-bearing component into said solvent, said sulfur-bearing component and said gas reacting in such a manner that sulfur from said sulfur-bearing component reacts with the mercury upon said mercury-contaminated aluminum surface to render it inert to aluminum.

2. The method of claim 1 wherein the liquid solvent of (a) is carbon disulfide.

3. The method of claim 1 wherein the liquid solvent of (a) is carbonyl sulfide.

4. The method of claim 1 wherein the liquid solvent of (a) is tetrahydrofuran.

5. The method of claim 1 wherein the sulfur-bearing component of (c) is gaseous hydrogen sulfide.

6. The method of claim 1 wherein said gas is sulfur dioxide.

7. The method of claim 1 wherein said gas is ammonia.

8. The method of claim 1 including the step of maintaining the temperature of said aluminum surface below about 0° C.

9. A method for rendering mercury and mercury amalgam present on an aluminum surface inert to aluminum, comprising:
    (a) depositing on said aluminum surface a liquid solvent capable of dissolving hydrogen sulfide;
    (b) contacting the resulting liquid solvent-wet surface with gaseous hydrogen sulfide;
    (c) contacting said solvent-wet aluminum surface with a reactant for releasing sulfur from hydrogen sulfide present in said liquid solvent, whereby said sulfur reacts with said mercury to form a compound inert to aluminum.

10. The method of claim 9 wherein said reactant comprises sulfur dioxide.

11. The method of claim 9 wherein said reactant comprises ammonia gas.

12. A method for rendering mercury and mercury amalgam present on an aluminum surface inert to aluminum, comprising:
    (a) providing a vaporized solvent having hydrogen sulfide dissolved therein;
    (b) condensing said vaporized solvent mixed with said dissolved hydrogen sulfide onto said aluminum surface;
    (c) contacting said solvent-wet aluminum surface with a gas capable of reacting with hydrogen sulfide and releasing sulfur therefrom, whereby said sulfur reacts with said mercury to form a compound inert to aluminum.

13. The method of claim 12 wherein the solvent of (a) is carbon disulfide.

14. The method of claim 12 wherein the solvent of (a) is carbonyl sulfide.

15. The method of claim 12 wherein the solvent of (a) is tetrahydrofuran.

16. The method of claim 12 wherein the gas of (c) is selected from the group consisting of sulfur dioxide and ammonia.

17. The method of claim 12 wherein the gas of (c) is sulfur dioxide.

18. The method of claim 12 wherein the gas of (c) is ammonia.

19. The method of claim 12 including the step of maintaining the temperature of said aluminum surface below about 0° C.

20. A method for treating a mercury-contaminated aluminum surface comprising:
    maintaining the temperature of said surface below about zero degrees Centigrade;
    providing a solvent capable of dissolving a sulfur-bearing component;
    contacting said surface with said solvent;
    dissolving a sulfur-bearing component within said solvent; and
    dissolving a substance reactive with said sulfur-bearing component in said solvent, said substance being capable of causing the release of sulfur from said sulfur-bearing component,
    whereby said sulfur reacts with said mercury to form mercuric sulfide.

21. A method as defined in claim 20 wherein said solvent is condensed upon said mercury-contaminated aluminum surface.

22. A method as defined in claim 20 wherein said sulfur-bearing component is hydrogen sulfide.

23. A method as defined in claim 20 wherein said substance is sulfur dioxide.

* * * * *